United States Patent
Habara

(10) Patent No.: US 8,215,784 B2
(45) Date of Patent: Jul. 10, 2012

(54) BACKLIGHT DEVICE

(75) Inventor: Hirofumi Habara, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 12/860,182

(22) Filed: Aug. 20, 2010

(65) Prior Publication Data

US 2011/0044028 A1   Feb. 24, 2011

(30) Foreign Application Priority Data

Aug. 20, 2009   (JP) .................................. 2009/190938

(51) Int. Cl.
*G09F 13/04* (2006.01)

(52) U.S. Cl. ........................ 362/97.1; 362/634; 362/633

(58) Field of Classification Search ........ 362/97.1–97.4, 362/632–634, 606–608
See application file for complete search history.

(56) References Cited

U.S. PATENT DOCUMENTS 7,440,394 B2 * 10/2008 Ohenoja et al. ............... 370/216

FOREIGN PATENT DOCUMENTS

JP   2008-090094   4/2008

* cited by examiner

*Primary Examiner* — Evan Dzierzynski
(74) *Attorney, Agent, or Firm* — Young & Thompson

(57) ABSTRACT

A backlight device includes a chassis which is box in shape and having a bottom part and four side walls, a light source arranged on the bottom part of the chassis, a diffuser panel supported by a top end surface of each of the side walls of the chassis, and an optical sheet arranged on the diffuser panel, wherein the top end surface of each of the side walls is downward sloping so that height becomes continuously low toward inside the chassis.

5 Claims, 6 Drawing Sheets

BACKLIGHT DEVICE

This application is based upon and claims the benefit of priority from Japanese Patent Application No. 2009-190938, filed on Aug. 20, 2009, the disclosure of which is incorporated herein in its entirety by reference.

TECHNICAL FIELD

The present invention relates to a backlight device.

BACKGROUND ART

A backlight device which is used as a light source for a liquid crystal display television or the like generally comprises a diffuser panel which is made of acrylic board or the like and arranged in front of the fluorescent lamp. An optical sheet such as a diffusion sheet, a lens sheet or a polarizing sheet is arranged in front of the diffuser panel, and these are held by a chassis (a backlight rear chassis). In such backlight device, especially a direct backlight device in which an irradiation surface is supported in a vertical direction, the ambient temperature around the diffuser panel rises when the backlight device is lit. Then, the diffuser panel expands. Therefore, enough clearance in a horizontal direction is provided between the backlight rear chassis and the diffuser panel.

In a backlight device described in Japanese Patent Application Laid-open Publication No. 2008-090094, a fluorescence tube which is a light source is arranged inside a chassis which is shallow depth box in shape and supported in a vertical direction. The chassis also has a plurality of collinear projections arranged in alignment in a horizontal direction on the upper part of front surface of the chassis. And a diffuser panel is locked by the plurality of projections. The width of the central locking hole among locking holes formed on the diffuser panel is approximately the same as the width of the projection inserted into the locking hole. Moreover, the width of each locking hole of right and left is larger than the width of the projection inserted in the locking hole.

SUMMARY

An exemplary object of the invention is to provide a backlight device which enables free expansion and shrinkage of a diffuser panel while suppressing occurrence of a vibration sound and generation of foreign substances caused by contact of the diffuser panel and the chassis.

A back light device according to an exemplary aspect of the invention includes a chassis which is box in shape and having a bottom part and four side walls, a light source arranged on the bottom part of the chassis, a diffuser panel supported by a top end surface of each of the side walls of the chassis, and an optical sheet arranged on the diffuser panel, wherein the top end surface of each of the side walls is downward sloping so that height becomes continuously low toward inside the chassis.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 6:
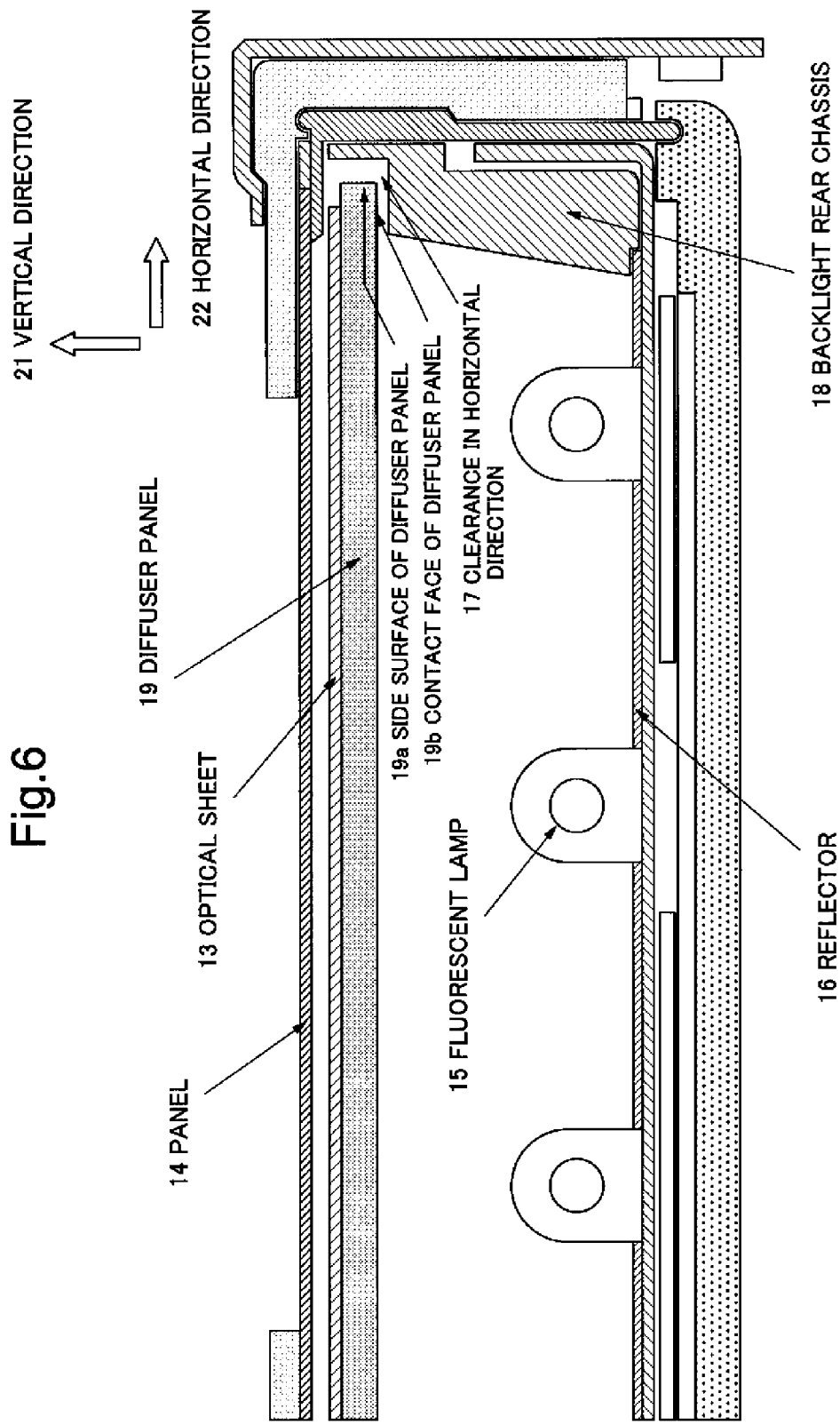
FIG. 6 is a cross section showing the structure of an image display apparatus including a backlight device in relation to the present invention.

As stated in the background art, the ambient temperature around the diffuser panel rises when the backlight device is lit. Thus, the distortion of the diffuser panel by thermal expansion occurs. As shown in FIG. 6, the distortion of the diffuser panel can be prevented by providing enough clearance 17 in a horizontal direction between the backlight rear chassis 18 and the diffuser panel 19. However, in this case, when the backlight device is placed in a severe vibration environment, the backlight rear chassis 18 and the diffuser panel 19 collide with each other repeatedly. Therefore, a vibration sound occurs, and a powder, breakage and cracks arise due to friction.

That is, although enough clearance between the backlight rear chassis 18 and the diffuser panel 19 is needed for preventing the distortion of the diffuser panel, the clearance becomes a cause of a vibration sound and foreign substances when vibration and impact occur.

Especially, in recent years, there are many occasions to mount an image display apparatus using a backlight device on artificial satellites, airplanes, automobiles, trains and vessels. That is, the backlight device is often used under the severe environmental conditions in which great vibration, impact and heat are added for many hours.

The random vibration test is used instead of a conventional sine wave vibration test for performance evaluation of the backlight device which is used under such severe environmental conditions.

Vibration occurring at the time of transportation by trucks and railways, an airplane flight and a rocket launching includes irregular waves by various frequency components or shock waves. That is, the vibration which occurs in such cases is not the vibration with always constant acceleration like sine wave oscillation, but is the vibration having very high acceleration irregularly. Accordingly, in the random vibration test, these irregular waves and shock waves are set up artificially, and performance evaluation is performed under the environment similar to the actual conditions.

If enough clearance in a horizontal direction is provided between the backlight rear chassis and the diffuser panel, the diffuser panel and the backlight rear chassis collide with each other repeatedly when the random vibration test is conducted to the backlight device. Thus, a vibration sound occurs, and a powder arises from the diffuser panel due to friction. Moreover, breakage and cracks are generated. Furthermore, contact area between the diffuser panel and the backlight rear chassis which supports the diffuser panel tends to be small due to the trend of narrowing the frame part of the image display apparatus. Therefore, very strong power is added to the contact area of the diffuser panel and the backlight rear chassis, when vibration occurs in a vertical direction. As a result, a powder arises from the contact area, and breakage and cracks arise. And foreign substances generated from the diffuser panel slip into a space between the diffuser panel and the optical sheet, and it causes a problem. That is, the foreign substances aggravate the picture quality by scratching the optical sheet or being projected onto a display surface.

Next, embodiments of the present invention will be described with reference to drawings. However, these embodiments do not limit the technical scope of the present invention.

First Embodiment

Figure 1:
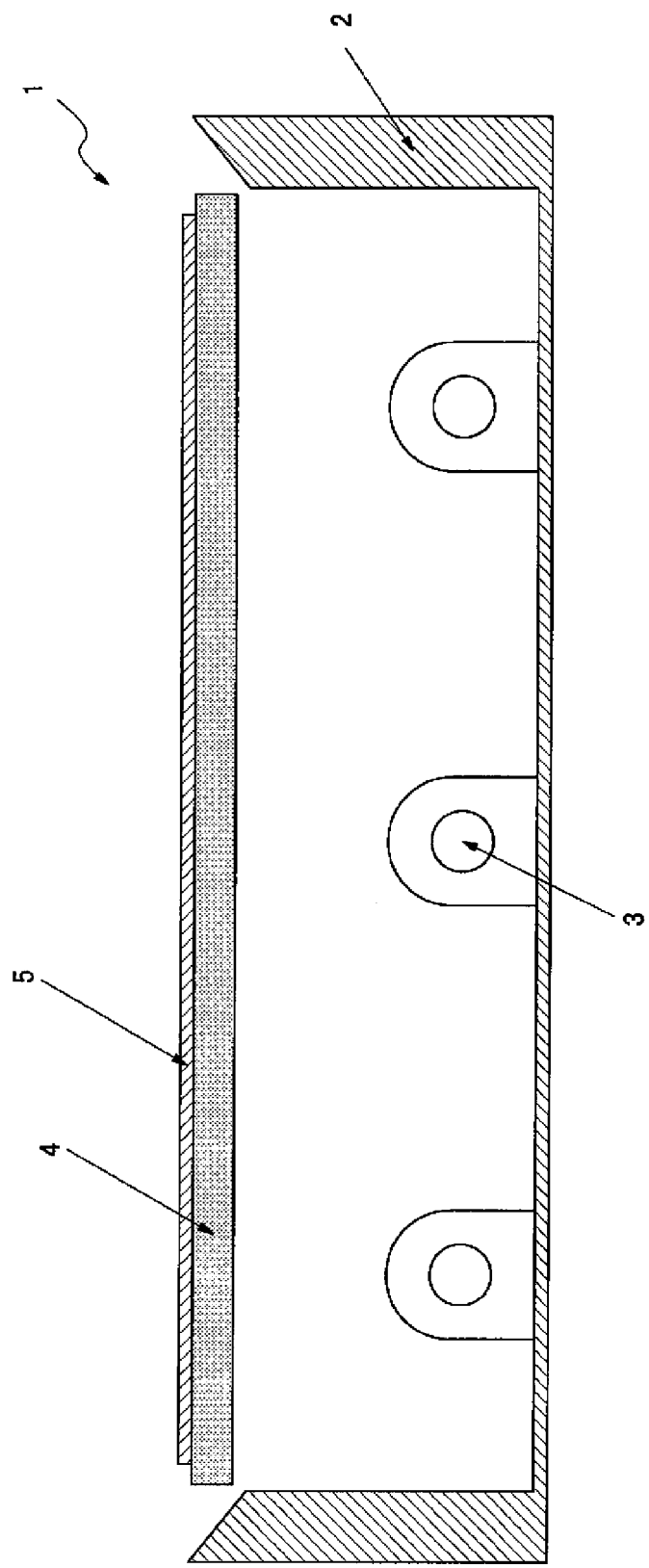
FIG. 1 is the structure of a backlight device according to the first embodiment of the present invention.

A backlight device according to the first embodiment of the present invention is shown in FIG. 1. The backlight device 1 of this embodiment includes a chassis 2, a light source 3, a diffuser panel 4 and an optical sheet 5. The chassis 2 is box in shape and having a bottom part and four side walls. The light source 3 is arranged on the bottom part of the chassis 2. The diffuser panel 4 is supported on a top end surface of each of the side walls of the chassis 2. The optical sheet 5 is arranged on the diffuser panel 4.

The top end surface of each of the side walls of the chassis 2 is downward sloping so that height becomes continuously low toward inside the chassis 2.

As a result, free expansion and shrinkage of the diffuser panel 4 can be enabled. Furthermore, collision between the diffuser panel 4 and the backlight rear chassis 2 can be prevented. Therefore, occurrence of a vibration sound and generation of foreign substances caused by contact of the diffuser panel 4 and the chassis 2 can be suppressed.

FIG. 1 shows that a side surface of the diffuser panel 4 is a surface perpendicular to a bottom face. However, it is not limited to this. That is, the side surface of the diffuser panel 4 may be inclined at the same angle as the top end surface of the side wall of the chassis 2.

Second Embodiment

The structure of a backlight device in this embodiment will be described using FIGS. 2 to 4.

Figure 2:
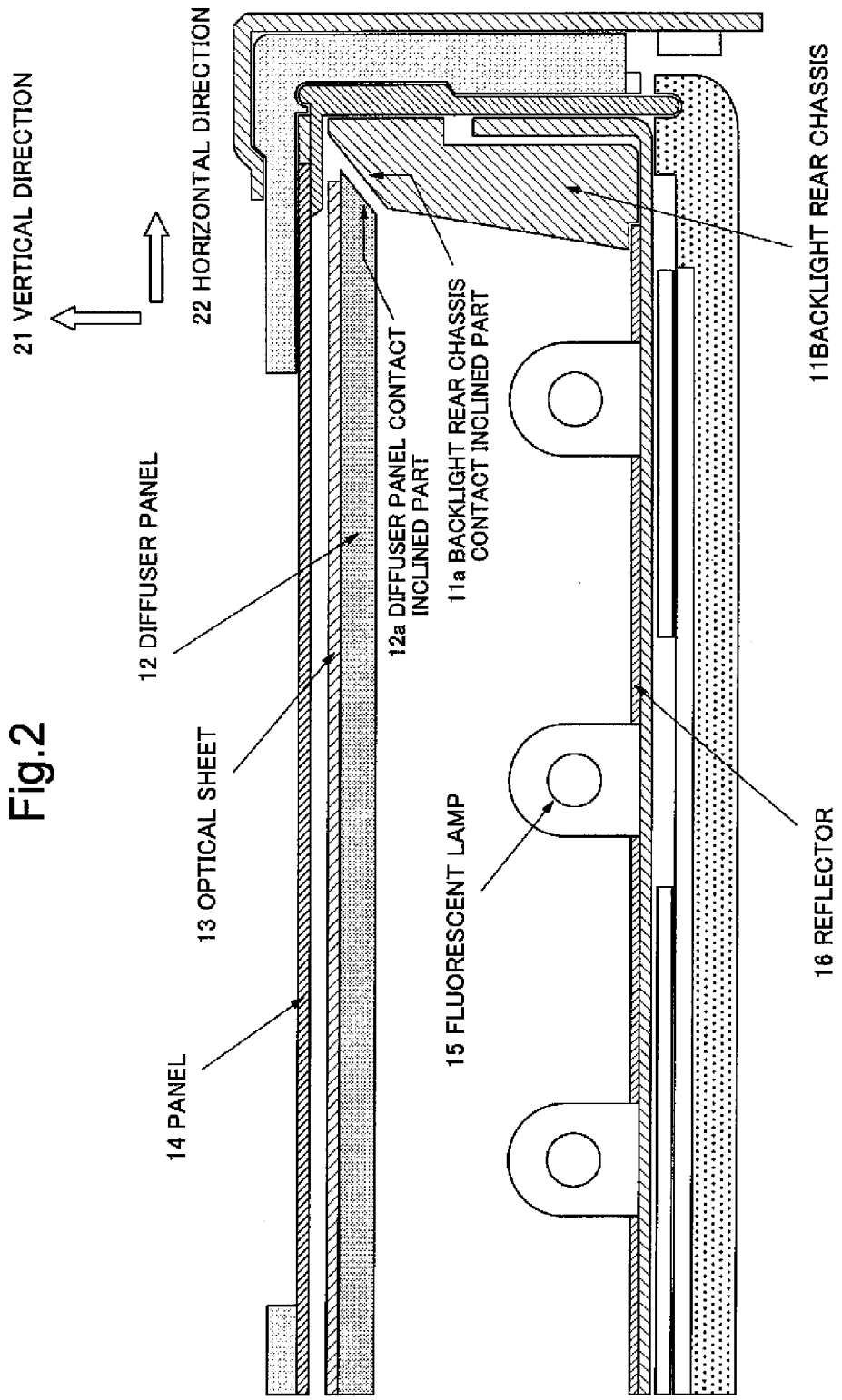
FIG. 2 is a cross section showing the structure of an image display apparatus including a backlight device according to the second embodiment of the present invention.

FIG. 2 is a cross section showing the structure of an image display apparatus including the backlight device of this embodiment. Respective FIG. 3 and FIG. 4 is a magnified cross section showing the vicinity of contact portion of the backlight rear chassis and the diffuser panel. FIG. 3A shows a cross section of the backlight device of this embodiment. FIG. 3B shows a cross section of the backlight device related to the present invention shown in FIG. 6. FIGS. 4A and 4B show each of the states before and after expansion of the diffuser panel of the backlight device of this embodiment.

As shown in FIG. 2, the image display apparatus of this embodiment includes a panel 14, a backlight device which illuminates the panel 14 and a chassis which holds these.

The panel 14 is a liquid crystal display panel, for example. The liquid crystal display panel comprises two substrates and a liquid crystal material sandwiched by the two substrates. One of the two substrates is a substrate on which switching elements such as TFT (Thin Film Transistor) are arranged in a matrix. Another substrate is a substrate on which color filters and black matrixes are arranged.

The backlight device includes a light source (fluorescent lamp 15, for example), a reflector 16, a diffuser panel 12, an optical sheet 13 and a chassis (a backlight rear chassis 11) which holds these. The fluorescent lamp 15 emits backlight. The reflector 16 reflects emitted light from the fluorescent lamp 15 to the panel 14. The diffuser panel 12 diffuses light applied directly from the fluorescent lamp 15 or light reflected by the reflector 16. The optical sheet 13 is, for example, a diffusion sheet, a lens sheet or a polarizing sheet.

There is also another contact portion of the backlight rear chassis 11 and the diffuser panel 12 on the left side extension of FIG. 2 like the right side of FIG. 2. Furthermore, while FIG. 2 is a figure showing a cross section of the array direction of the fluorescent lamp 15, it is also the same configuration as FIG. 2 in the depth direction of the fluorescent lamp 15.

The image display apparatus in this embodiment has features in the structure of the contact portion of the backlight rear chassis 11 and the diffuser panel 12. Thus, the structure, shape and arrangement of other members are not limited in particular. For example, the light source in FIG. 2 may be any light source which generates heat causing the diffuser panel 12 to expand, and is not limited to the fluorescent lamp 15. The composition of the light source, the arrangement and the number are optional.

Next, the structure of the contact portion of the backlight rear chassis 11 and the diffuser panel 12 will be explained in detail.

The backlight rear chassis 11 is a chassis of box in shape with a shallow bottom including one or more members and has a bottom part and four side walls. The light source (fluorescent lamp 15) is arranged on the bottom part of the backlight rear chassis 11. The diffuser panel 12 having a rectangular shape is arranged on the top end surface of each of the four side walls of the backlight rear chassis 11. And, the optical sheet 13 which is almost the same shape as the diffuser panel 12 is arranged in front of the diffuser panel 12.

Figure 3:
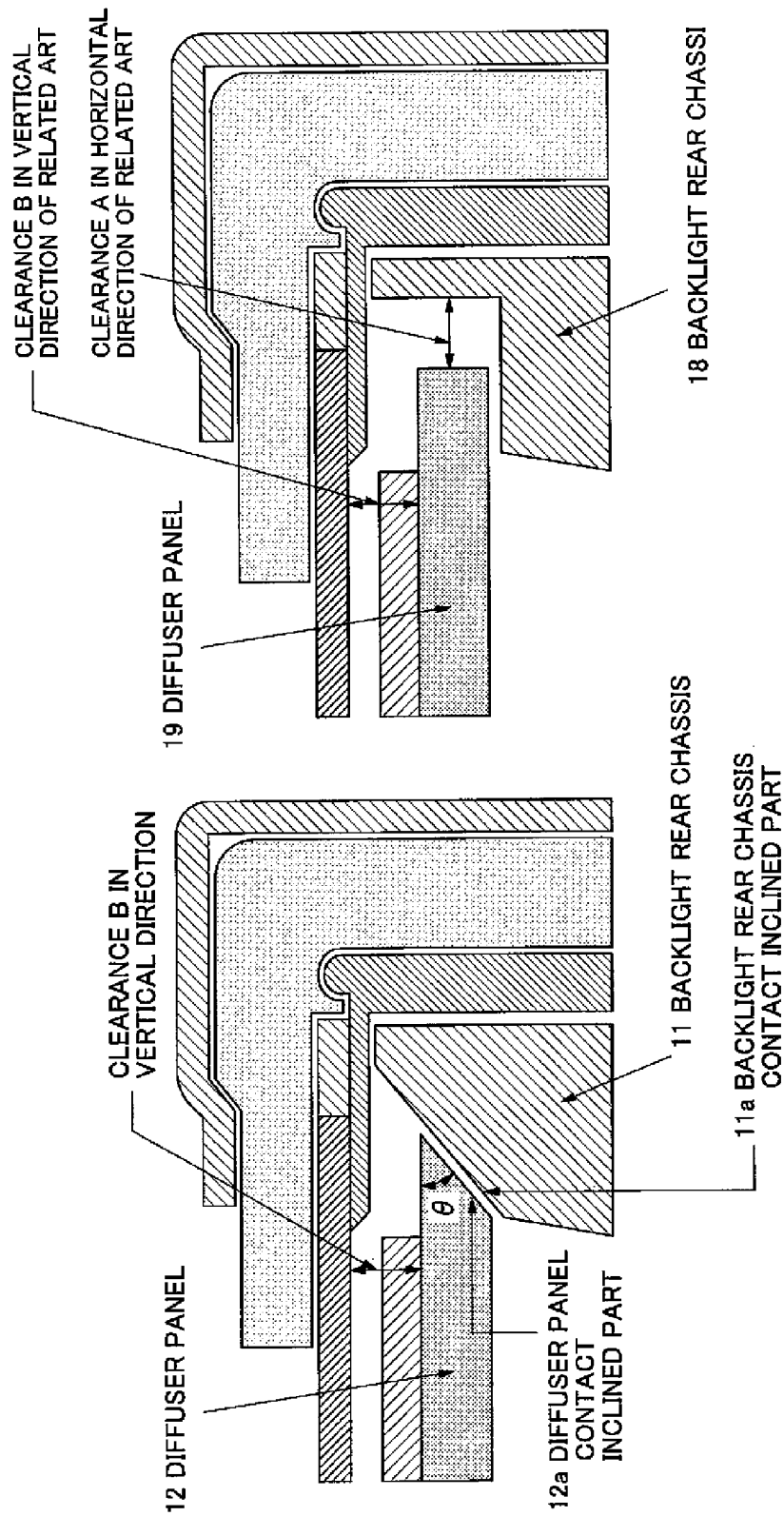
FIG. 3A is a magnified cross section showing the vicinity of contact portion of the backlight rear chassis and the diffuser panel shown in FIG. 2.
FIG. 3B is a magnified cross section showing the vicinity of contact portion of the backlight rear chassis and the diffuser panel shown in FIG. 6.

FIG. 3 is a magnified cross section showing the vicinity of contact portion of the backlight rear chassis and the diffuser panel. In the backlight device related to the present invention shown in FIG. 3B, clearance in a horizontal direction is provided between the side surface of the diffuser panel 19 and the backlight rear chassis 18. As a result, free expansion and shrinkage of the diffuser panel 19 is enabled. However, when vibration occurs in a horizontal direction, the side surface of the diffuser panel 19 moves to the horizontal direction and collides with the backlight rear chassis 18 repeatedly. As a result, there is a problem in which a vibration sound occurs, and a powder, breakage and cracks arise due to friction.

On the other hand, in the backlight device of this embodiment shown in FIG. 3A, a downward slope (a backlight rear chassis contact inclined part 11a) where height becomes continuously low toward the inside is formed on the top end surface of each of the side walls of the backlight rear chassis 11 which supports the diffuser panel 12. Also, on the side surface of the diffuser panel 12, a similar face (a diffuser panel contact inclined part 12a) having almost the same incline as the backlight rear chassis contact inclined part 11a is formed. As a result, the diffuser panel 12 and the backlight rear chassis 11 are in contact with each other at both inclined parts. Therefore, even if vibration occurs in a horizontal direction, collision between the diffuser panel 12 and the backlight rear chassis 11 can be prevented. Therefore, occurrence of a vibration sound and generation of a powder, breakage and cracks by friction can be suppressed.

The diffuser panel 12 is heated and expanded while the backlight device is lit. The Expansion growth ΔL in a horizontal direction of the diffuser panel 12 at this time is expressed in the formula 1.

Where, the inclination angle of the diffuser panel contact inclined part 12a is θ, the length of the diffuser panel 12 before expansion is $L_0$, the length of the diffuser panel 12 after expansion is L, the temperature difference [K] is t, and the inherent linear expansion coefficient of the diffuser panel is α.

$$\Delta L = L - L_0 = \alpha L_0 t \qquad \text{(formula 1)}$$

The expansion growth ΔL in a horizontal direction of the diffuser panel 12 expressed in the formula 1 is converted into the displacement amount in a vertical direction by the backlight rear chassis contact inclined part 11a which supports the diffuser panel 12. Therefore, the diffuser panel 12 performs sliding movement.

Figure 4:
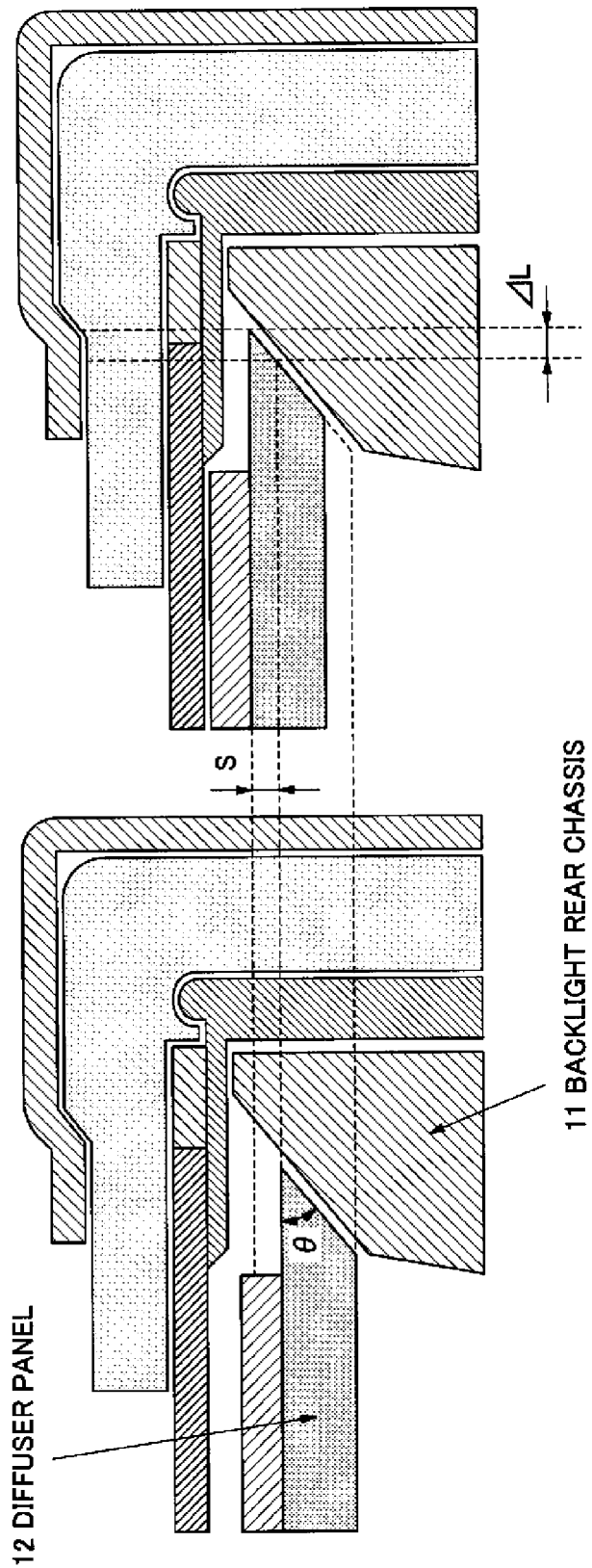
FIG. 4A is a magnified cross section showing the vicinity of contact portion of the backlight rear chassis and the diffuser panel shown in FIG. 2 in the state before expansion of the diffuser panel.
FIG. 4B is a magnified cross section showing the vicinity of contact portion of the backlight rear chassis and the diffuser panel shown in FIG. 2 in the state after expansion of the diffuser panel.

As shown in FIG. 4, it supposed that the displacement amount by the sliding movement of the diffuser panel 12 is S. The displacement amount by the sliding movement S is expressed in the formula 2.

$$S = \Delta L \tan \theta \qquad \text{(formula 2)}$$

That is, the diffuser panel 12 can move to a vertical direction by the expansion force to a horizontal direction because of providing a slope as the backlight rear chassis contact inclined part 11a. Therefore, even if clearance is not provided to a horizontal direction, free expansion and shrinkage of the diffuser panel 12 becomes possible. As a result, the distortion by the expansion and shrinkage of the diffuser panel 12 can be prevented.

The diffuser panel 12 has a larger contact area with the backlight rear chassis compared with the diffuser panel 19 shown in FIG. 3B because of having the diffuser panel contact inclined part 12a. Therefore, it makes it possible that the force acting on the unit area of the diffuser panel 12 becomes small at the time of contact with the diffuser panel 12 and the backlight rear chassis. As a result, generation of breakage and cracks of the diffuser panel 12 by vibration occurred in a vertical direction can be reduced. Therefore, a problem of aggravation of the picture quality and damage to the optical sheet 13 caused by generation of foreign substances can be evaded.

Here, the clearance in a horizontal direction of the diffuser panel 19 shown in FIG. 3B is called as "clearance A", and the clearance in a vertical direction is called as "clearance B". In this case, the total clearance of the horizontal direction and the vertical direction of the diffuser panel 19 is "clearance A+clearance B". On the other hand, the clearance in a vertical direction of the diffuser panel 12 in this embodiment shown in FIG. 3A becomes "ΔL tan θ+clearance B". If the inclination angle θ of the diffuser panel contact inclined part 12a is set less than 45 degrees, ΔL tan θ becomes smaller than the clearance A. That is, when the inclination angle θ of the diffuser panel contact inclined part 12a is set less than 45 degrees, the clearance in a vertical direction between the diffuser panel 12 and the backlight rear chassis 11 becomes smaller than the total clearance of the horizontal direction and the vertical direction of the diffuser panel 19.

Therefore, the collision between the diffuser panel 12 and the backlight rear chassis 11 can be suppressed by setting the inclination angle θ of the diffuser panel contact inclined part 12a less than 45 degrees.

Thus, by inclining a contact portion of the diffuser panel 12 and the backlight rear chassis 11, occurrence of a vibration sound caused by vibration can be suppressed. It is also possible to suppress generation of a powder, breakage and cracks by friction, and to resolve aggravation of the picture quality. Moreover, the diffuser panel 12 can perform expansion and shrink freely.

According to this embodiment, the backlight rear chassis contact inclined part 11a is formed on the backlight rear chassis 11, and also the diffuser panel contact inclined part 12a is formed on the diffuser panel 12. However, it is not limited to this. That is, the inclined part may only be formed on the backlight rear chassis 11. In this case, the contact area of the backlight rear chassis 11 and the diffuser panel 12 becomes small. However, it is still possible to prevent collision between the diffuser panel 12 and the backlight rear chassis 11 with enabling free expansion and shrinkage of the diffuser panel 12.

As above, in the backlight device of this embodiment, the top end surface of each of the side walls of the backlight rear chassis which supports the diffuser panel inclines. The side surface of the diffuser panel also inclines by similar inclination angle so that the diffuser panel may perform sliding movement along the side wall surface of the backlight rear chassis. As a result, the diffuser panel can move in a vertical direction and prevent collision between the diffuser panel and the backlight rear chassis in a horizontal direction. Therefore, free expansion and shrinkage of the diffuser panel becomes possible with suppressing occurrence of a vibration sound and foreign substances caused by vibration and impact.

By forming inclination on the respective contact faces of the backlight rear chassis and the diffuser panel, an area of portion where these two contact faces are touching becomes larger than the structure shown in FIG. 6. As a result, the force per unit area acting on the diffuser panel can be made small. Therefore, generation of breakage and cracks of the diffuser panel due to vibration occurred in a vertical direction can be reduced.

Also, the diffuser panel can move in a vertical direction by the force expanding in a horizontal direction because the contact face with the diffuser panel of the backlight rear chassis inclines. Therefore, free expansion and shrinkage of the diffuser panel becomes possible. Thus, the distortion by the expansion and shrinkage of the diffuser panel can be suppressed.

Third Embodiment

Next, a backlight device according to the third embodiment of the present invention will be described.

The backlight device in this embodiment forms the inclination angle θ of equal to or more than 45 degrees as the diffuser panel contact inclined part 12a in FIG. 3A. In this case, vector component in horizontal direction of the inclination becomes small compared with a case where the inclination angle θ of the diffuser panel contact inclined part 12a is less than 45 degrees. Therefore, the displacement amount of the diffuser panel 12 to the horizontal direction becomes small. As a result, friction between the backlight rear chassis contact inclined parts 11a and the diffuser panel contact inclined parts 12a can be reduced compared with the second embodiment.

Therefore, the backlight device in this embodiment shows an extremely good effect in particular to vibration in a horizontal direction. That is, even when the vibration in a horizontal direction is outstandingly severe, occurrence of a vibration sound and generation of foreign substances can be suppressed.

Fourth Embodiment

Next, a backlight device according to the fourth embodiment of the present invention will be described.

It has focused to the diffuser panel 12 and the backlight rear chassis 11 in the second embodiment and the third embodiment. On the other hand, the optical sheet 13 is also heated like the diffuser panel 12 while the backlight device is lit, and it expands. And if the inherent linear expansion coefficient β of the optical sheet is larger than the inherent linear expansion coefficient α of the diffuser panel, and the size of the optical sheet 13 is the same size as the diffuser panel 12, a problem occurs. That is, the optical sheet 13 expands more than the diffuser panel 12, and wrinkles arise to the optical sheet 13.

On the other hand, in the backlight device of this embodiment, the size of the optical sheet 13 is smaller than the size of the diffuser panel 12. Therefore, even when the inherent linear expansion coefficient β of the optical sheet is larger than the inherent linear expansion coefficient α of the diffuser panel, the problem mentioned above hardly occurs.

Further, if the inherent linear expansion coefficient β of the optical sheet is the same as the inherent linear expansion coefficient α of the diffuser panel, the size of the optical sheet 13 may be the same size as the diffuser panel 12.

Fifth Embodiment

Figure 5:
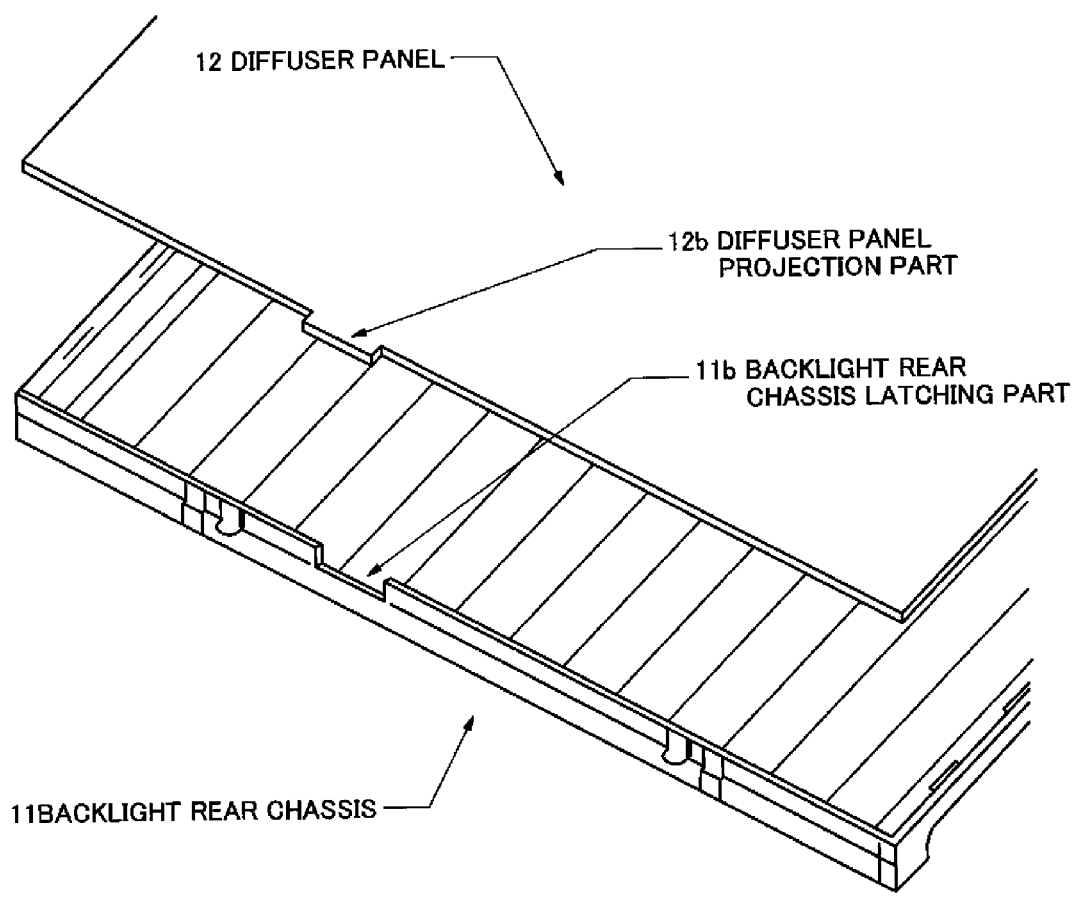
FIG. 5 is a perspective view showing the structure of a backlight device according to the fifth embodiment of the present invention.

Next, a backlight device according to the fifth embodiment of the present invention will be described with reference to FIG. 5. FIG. 5 is a perspective view showing the structure of the backlight device of this embodiment.

According to this embodiment, a diffuser panel projection part 12b which is rectangular in shape and projecting to the side is protruded on a side surface of the diffuser panel 12 in addition to the structure of the second to fourth embodiments. The diffuser panel projection part 12b is formed on a part of the side among the rim on which the diffuser panel contact inclined part 12a is not formed. A concave part (a backlight rear chassis latching part 11b), which cut away an upper part of the side wall and the diffuser panel projection part 12b can fit in, is formed on a corresponding part of the backlight rear chassis 11 to the diffuser panel projection part 12b of the diffuser panel 12. That is, the backlight rear chassis latching part 11b may be formed on at least one of the four side walls. And, the diffuser panel projection part 12b is fit to latch on to the backlight rear chassis latching part 11b.

As a result, it is possible to prevent the diffuser panel 12 from expanding to the direction that is largely different from a reference position when the diffuser panel 12 is heated and expanding while the backlight device is lit.

The diffuser panel projection part 12b and the backlight rear chassis latching part 11b may be formed on only one side, or may be formed on a pair of sides opposing each other. The diffuser panel 12 may be fixed to a part of the backlight rear chassis 11 by a tape instead of the structure that fits a projection and a concave part in. In this case, it can also prevent a difference from a reference position.

In each above-mentioned embodiment, it has described about a direct backlight device which arranges the fluorescent lamp 15 on the bottom part of the backlight rear chassis 11. However, it is not limited to this. That is, the backlight device in each above-mentioned embodiment may be a backlight device of a configuration which arranges a light source on a side surface.

The backlight device in each above-mentioned embodiment can be applied to various image display apparatuses having a backlight device.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of invention faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A backlight device comprising:
   a chassis which is box in shape and having a bottom part and four side walls;
   a light source arranged on the bottom part of the chassis;
   a diffuser panel supported by a top end surface of each of the side walls of the chassis; and
   an optical sheet arranged on the diffuser panel, wherein the top end surface of each of the side walls is downward sloping so that height becomes continuously low toward inside the chassis, and
   wherein a concave part which cut away an upper part of the side wall is formed on at least one of the four side walls, and a projection part which is fit to latch on to the concave part is formed on a side surface of the diffuser panel.

2. The backlight device according to claim 1, wherein a side surface of the diffuser panel which is opposed to the top end surface of the side wall has an inclination parallel to an inclination formed on the top end surface of the side wall.

3. The backlight device according to claim 1, wherein an inclination angle of the top end surface of the side wall is less than 45 degrees.

4. The backlight device according to claim 1, wherein an inclination angle of the top end surface of the side wall is equal to or more than 45 degrees.

5. The backlight device according to claim 1, wherein a size of the optical sheet is smaller than a size of the diffuser panel.

* * * * *